US012410737B2

(12) United States Patent
Smith et al.

(10) Patent No.: US 12,410,737 B2
(45) Date of Patent: Sep. 9, 2025

(54) INTERNAL COMBUSTION ENGINE WITH VENTILATION SYSTEM FOR A CRANKCASE

(71) Applicant: Caterpillar Inc., Peoria, IL (US)

(72) Inventors: Lucas K. Smith, Lafayette, IN (US); Rodney Allen Lawrence, Frankfort, IN (US); Joseph G. Chambers, Edwards, IL (US); Jarrett T. Corcoran, Washington, IL (US); Brandyn A. Stack, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 18/517,763

(22) Filed: Nov. 22, 2023

(65) Prior Publication Data

US 2025/0163836 A1 May 22, 2025

(51) Int. Cl.

| | |
|---|---|
| ***F01M 13/04*** | (2006.01) |
| ***F02B 37/00*** | (2006.01) |
| ***F02M 25/06*** | (2016.01) |
| ***F02M 31/04*** | (2006.01) |
| ***F02M 31/20*** | (2006.01) |

(52) U.S. Cl.

CPC ............. *F01M 13/04* (2013.01); *F02B 37/00* (2013.01); *F02M 25/06* (2013.01); *F02M 31/042* (2013.01); *F02M 31/20* (2013.01); *F01M 2013/0438* (2013.01)

(58) Field of Classification Search

CPC ............... F01M 13/04; F01M 13/0011; F01M 2013/0438; F01M 2013/0038; F02B 37/00; F02M 25/06; F02M 31/042; F02M 31/20; F02M 31/02; F02M 35/10157; F02M 35/10222

See application file for complete search history.

(56) References Cited

U.S. PATENT DOCUMENTS 4,768,493 A 9/1988 Ohtaka et al.
6,691,687 B1 * 2/2004 Liang .................... F01M 13/04 123/573
9,726,067 B2 8/2017 Hakeem et al.
11,852,057 B2 * 12/2023 Himuro ................. F02M 26/28
(Continued)

FOREIGN PATENT DOCUMENTS

JP 6079349 1/2017
JP 2017008721 1/2017
JP 2019178609 10/2019

*Primary Examiner* — Grant Moubry
(74) *Attorney, Agent, or Firm* — Schwegman Lundberg & Woessner, P.A.

(57) ABSTRACT

Apparatuses, systems and methods are disclosed including internal combustion engine optionally including: a crankcase having a blow-by gas passing therethrough; a source of a boost air; a jacket containing a water; an oil separating apparatus in fluid communication with the boost air and the blow-by gas and having a coalescing filter to separate oil from the blow-by gas; and a heat exchanger in fluid communication with the boost air, wherein the heat exchanger is in fluid communication with the jacket to receive the water, wherein the water is passed in a heat transfer relationship with the boost air in the heat exchanger to achieve a desired temperature range for the boost air passing to the oil separating apparatus.

18 Claims, 5 Drawing Sheets

(56) References Cited

U.S. PATENT DOCUMENTS

| | | | | |
|---|---|---|---|---|
| 2015/0247432 | A1* | 9/2015 | Fujikawa | F01M 13/023 123/573 |
| 2015/0361839 | A1* | 12/2015 | Kimura | F01M 5/002 184/6.5 |
| 2023/0066495 | A1 | 3/2023 | Nix | |

* cited by examiner

INTERNAL COMBUSTION ENGINE WITH VENTILATION SYSTEM FOR A CRANKCASE

TECHNICAL FIELD

The present disclosure relates to internal combustion engines such as those for vehicles or stationary power generation. More particularly, the present disclosure relates to heating and/or cooling boost air of a crankcase ventilation system for the internal combustion engine.

BACKGROUND

Machinery, for example, agricultural, industrial, construction or other heavy machinery can be propelled by an internal combustion engine(s). Internal combustion engines can be used for other purposes such as for power generation. Internal combustion engines combust a mixture of air and fuel in cylinders and thereby produce drive torque and power. Internal combustion engines typically include a crankcase to provide a housing for a crankshaft of the engine. A portion of the combustion gases (termed "blow-by") may escape the combustion chamber past the piston and enter undesirable areas of the engine such as the crankcase. Crankcase ventilation systems exist. These systems can utilize filtration to reduce methane footprint, reduce particulate matter levels and reduce loss of oil. Additionally, crankcase ventilation systems are known in internal combustion engines to vent blow-by gases within the crankcase. For example, U.S. Pat. No. 4,768,493, Japanese Patent Application Publication No. 2019178609 and United States Patent Application Publication No. 2023/0066495 disclose examples of crankcase ventilation systems. However, this patent and these patent applications do not provide for heating and/or cooling of engine boost air in the manner disclosed herein.

SUMMARY

In an example according to this disclosure, an internal combustion engine optionally including: a crankcase having a blow-by gas passing therethrough; a source of a boost air; a jacket containing a water; an oil separating apparatus in fluid communication with the boost air and the blow-by gas and having a coalescing filter to separate oil from the blow-by gas; and a heat exchanger in fluid communication with the boost air, wherein the heat exchanger is in fluid communication with the jacket to receive the water, wherein the water is passed in a heat transfer relationship with the boost air in the heat exchanger to achieve a desired temperature range for the boost air passing to the oil separating apparatus.

In another example according to this disclosure, an engine system optionally including: a crankcase of an engine having a blow-by gas passing therethrough; a source of a boost air; a jacket containing a water; an oil separating apparatus in fluid communication with the boost air and the blow-by gas and having a coalescing filter to separate oil from the blow-by gas; and a heat exchanger in fluid communication with the boost air, wherein the heat exchanger is in fluid communication with the jacket to receive the water, wherein the water is passed in a heat transfer relationship with the boost air in the heat exchanger to achieve a desired temperature range for the boost air passing to the oil separating apparatus.

In yet another example according to this disclosure, a method of maintaining a blow-by gas from a crankcase of an engine within a desired temperature range when passing through an oil separating apparatus is disclosed. The method optionally including: passing the blow-by gas from the crankcase to the oil separating apparatus; supplying a water from a jacket to a heat exchanger, wherein within the heat exchanger the water is in a heat transfer relationship with a boost air passing through the heat exchanger and heats or cools the boost air to a desired temperature range; passing the boost air at the desired temperature range to the oil separating apparatus; separating oil from the blow-by gas with the oil separating apparatus; passing the blow-by gas after leaving the oil separating apparatus to a charged air system; and returning the water to the jacket after passing through the heat exchanger.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples according to this disclosure are directed to crankcase ventilation systems for supplying filtered blow-by gas to the internal combustion engine to separate oil from blow-by and re-ingest the blow-by into a charged air system. Examples of the present disclosure are now described with reference to the accompanying drawings. The following description is merely exemplary in nature and is not intended to limit the present disclosure, application, or use. Examples described set forth specific components, devices, systems and methods, to provide an understanding of embodiments of the present disclosure. It will be apparent to those skilled in the art that specific details need not be employed and that examples may be embodied in many different forms. Thus, the examples provided should not be construed to limit the scope of the claims.

As used herein, the terms “comprises,” “comprising,” “having,” including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, “about,” “substantially,” “generally,” and “approximately” are used to indicate a possible variation of ±15% in a stated value.

Figure 1:
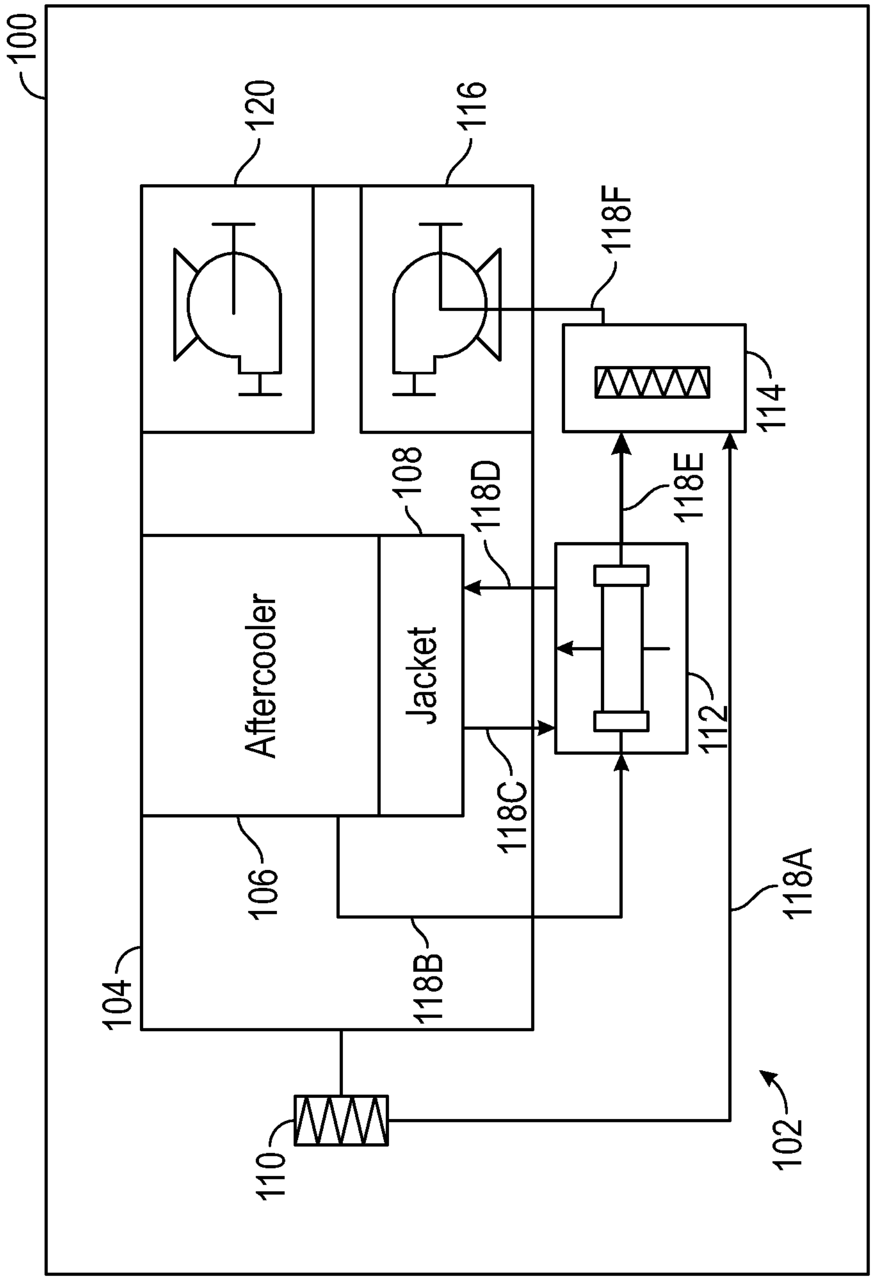
FIG. 1 is a highly schematic illustration of an example internal combustion engine including a crankcase and a ventilation system for the crankcase including a heat exchanger for warming boost air in accordance with an example of this disclosure.

FIG. 1 depicts in a highly schematic manner of an internal combustion engine 100 (generally referred to as “engine” herein for simplicity) in accordance with this disclosure. The engine 100 can be used for power generation such as for the propulsion of vehicles or other machinery or for stationary power generation. The engine 100 can include various power generation platforms, and can use fuel including, for example, gasoline, gaseous fuel, diesel or blends thereof. Stationary engines may be used to drive immobile equipment, such as pumps, generators, mills, or factory equipment. In one embodiment, the engine 100 can be used in landfill applications for generating electricity. As such, the engine 100 may employ gaseous fuel. As used herein, “gaseous fuel” may include fuel that is supplied to the engine 100 in gaseous form and can include, for example, propane, natural gas, gas associated with natural gas such as bio-gas, landfill gas, carbon monoxide, hydrogen, hydrogen sulfide, or mixtures thereof. The fuel may have different levels of purity. As used herein, natural gas refers to both pure and relatively impure forms having various amounts of methane and other constituents. It is understood that the present disclosure can apply to any number of piston-cylinder arrangements and a variety of engine configurations including, but not limited to, V-engines, inline engines, and horizontally opposed engines, as well as overhead cam and cam-in-block configurations.

Figure 1A:
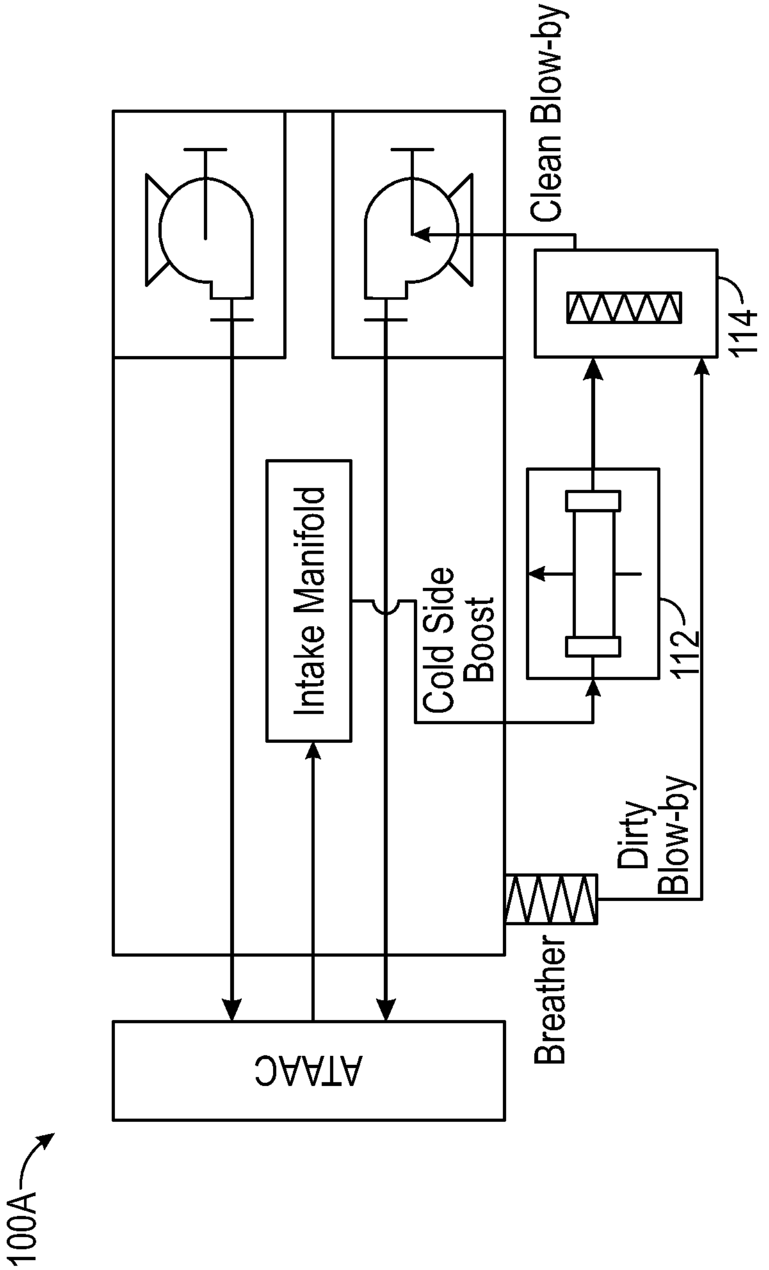
FIG. 1A is a highly schematic illustration of an example internal combustion engine including air-to-air-aftercooled system as part of the ventilation system for the crankcase in accordance with an example of this disclosure.

According to some embodiments such as the embodiment of FIG. 1A, the engine 100A can be air-to-air-aftercooled (“ATAAC”), (also called charge-air-cooled). As such, the engine 100A uses forced-air (instead of water) to cool the turbocharged air before it enters the engine’s combustion chamber. The engine 100A can be constructed in a manner similar to the engine 100 of FIG. 1 including the various components discussed below in reference to FIG. 1 including a heat exchanger 112 and an oil separating apparatus 114.

The internal combustion engine 100 or 100A can be used in stationary applications as discussed above but also can be used with vehicles and machinery that include those related to various industries, including, as examples, construction, agriculture, forestry, transportation, material handling, waste management, etc.

Referring now again to FIG. 1, the engine 100 can be a dual turbo engine according to one example. The engine 100 can include a ventilation system 102 for a crankcase 104, an aftercooler 106 and a jacket 108. The ventilation system 102 can include one or more breathers 110, a heat exchanger 112, an oil separating apparatus 114, a first turbocharger 116, passages 118A, 118B, 118C, 118D, 118E and 118F and a second turbocharger 120.

A motive air for the ventilation system 102 can be at boost pressure. The motive air can be routed to the oil separating apparatus 114 (as further discussed and illustrated) or to a crankcase ventilation device and can then be routed to the first turbocharger 116. The passages 118A, 118B, 118C, 118D, 118E and 118F allow for fluid communication between various components of the engine 100. Thus, the passage 118A fluidly connects the one or more breathers 110 with the oil separating apparatus 114. The passage 118B fluidly connects to the engine 100 downstream of or at the aftercooler 106 and fluidly communicates with the heat exchanger 112. The passages 118C and 118D fluidly connect the jacket 108 with the heat exchanger 112. The passage 118E fluidly connects the heat exchanger 112 to the oil separating apparatus 114. The passage 118F fluidly connects the oil separating apparatus 114 with the first turbocharger 116. Although not illustrated in FIG. 1, it is recognized that the ventilation system 102 can include valves or other regulators configured to regulate flow of fluid such as to prevent reverse flow when the pressure within the oil separating apparatus 114 and/or the heat exchanger 112 is lower than the pressure within the crankcase 104. The terms “passage”, “passages”, “passageway”, “passageways”, “line” or “lines” as used herein should be interpreted broadly. These terms can be features defined by the various components of the engine illustrated in the FIGURES or can be direct interfacing connections or can be formed by additional components (e.g., a hose, tube, pipe, manifold, cavity etc.) as known in the art.

In the example of FIG. 1, the one or more breathers 110 can be in fluid communication via the passage 118A to communicate a blow-by gas containing oil mist to the oil separating apparatus 114. Boost air from the engine 100 downstream or at the aftercooler 106 can be in fluid communication via the passage 118B with the heat exchanger 112. The heat exchanger 112 can be in fluid communication via the passage 118E with the oil separating apparatus 114 to communicate the boost air from the heat exchanger 112 to the oil separating apparatus 114. Thus, the heat exchanger 112 can be upstream of the oil separating apparatus 114 with respect to a flow direction of the boost air. The jacket 108 can be in fluid communication via the passages 118C and 118D with the heat exchanger to communicate a water with the heat exchanger 112. The oil separating apparatus 114 can be in fluid communication via the passage 118F with the first turbocharger 116 to communicate at least the filtered blow-by gas from the oil separating apparatus 114 to the first turbocharger 116.

Components of the ventilation system 102 such as the oil separating apparatus 114 and the heat exchanger 112 can be mounted to the engine 100. However, it is contemplated that such components may be separate from the engine 100 (e.g., not mounted thereto other than via passages 118A, 118B, 118C, 118D, 118E and 118F). The ventilation system 102 or some components thereof can be part of the original manufacture of the engine 100 or can be a retrofitted system that is added to the engine 100 during maintenance, upgrade or the like. The ventilation system 102 can be in fluid communication with the crankcase 104 such as via the passages 118A and additional passages or components not specifically shown. Although not illustrated, the ventilation system 102 can be configured to supply ambient air or air from a pressurized source to the crankcase 104.

The engine 100 can employ various components most not specifically illustrated. The engine 100 can include the aftercooler 106 for reducing the temperature of air utilized by systems of the engine 100 during operation. The aftercooler 106 can be downstream of and in fluid communication to receive relatively warmer air from the second turbocharger 120 (or other component such as a compressor), for example. The jacket 108 can be a source of liquid such as water used to cool various components of the engine 100 during operation. The water can additionally be used during engine startup according to some examples. This water can typically be about 100 degrees Celsius, for example. A pump (not shown) or other flow generating device can be used to pass the water from the jacket 108 to the heat exchanger 112 along the passage 118C and return the water to the jacket 108 from the heat exchanger 112 along the passage 118D.

Apparatuses such as the one or more breathers 110 can couple directly or indirectly to the engine block, and can be in fluid communication with the crankcase 104. Each of the one or more breathers 110 can comprise a mechanism that separates some of the oil droplets and oil mist from the blow-by gas in order to prevent some the oil droplets and oil mist contained in the blow-by gas from being taken out of the crankcase 104 along the flow of the blow-by gas. By way of example, the one or more breathers 110 can include one or more separation mechanisms such as an oil separation valve, splasher plate, serpentine passage, mesh or other obstruction. The one or more breathers 110 can be an outlet allowing passage of fumes, blow-by constituents and/or aerosolized oil to the passage 118A and/or atmosphere or another location such as away from the engine 100.

During engine startup and/or during extended engine idle, the boost air can be undesirably cold for general use by the ventilation system 102. This is especially the case when the engine 100 is operating in a cold environment. In particular, undesirably cold boost air can be insufficient to maintain the blow-by gas above the dew point temperature. If the blow-by gas falls below the dew point temperature for the blow-by gas, there is a risk of condensation/freezing of the water vapor, forming emulsion or ice in one or more of the various components discussed above including the oil separating apparatus 114 and within the engine 100 itself. Condensation/freezing can lead to high pressure within the crankcase 104 and engine shutdown. As such, it is desirable that the boost air is warmed by the ventilation system 102 for use particularly in the oil separating apparatus 114 where the boost air is combined with the blow-by gas.

The heat exchanger 112 can be a liquid-to-air heat exchanger such as a jacket heat exchanger, for example. The heat exchanger 112 can be configured to receive the boost air along passage 118B. Additionally, the heat exchanger 112 can be configured to receive the water from the jacket 108 along passage 118C. The heat exchanger 112 can be configured such that the water is passed in a heat transfer relationship with the boost air in the heat exchanger 112 to achieve a desired temperature range for the boost air passing to the oil separating apparatus 114. The desired temperature range can be between about 70 degrees Celsius and about 90 degrees Celsius, for example.

The ventilation system 102 can use the oil separating apparatus 114 or devices to filter oil (e.g., oil mist) from the blow-by gas to reduce volatile content in the blow-by gas. The oil separating apparatus 114 can contain a filter media such as a coalescing filter, desiccant, combinations thereof or other media. The blow-by gas can initially pass into a central passage or entry cavity of the oil separating apparatus 114. The filter media is configured to separate a portion of the oil contained in the blow-by gas. The filter media can have a construction known in the art. As an example, the filter media can be constructed using a single or multi-layer synthetic coalescing filter media wound around a core, or pleated. As an example, the filter media can be a layered but highly compressed metal mesh that is used as a first stage in separating moisture and oil from the blow-by gas. As oil entrained blow-by gas encounters this randomly woven maze, large water and oil droplets coalesce. In operation, the oil separating apparatus 114 can utilize the pressurized boost air (generally at intake manifold pressure) to offset restriction through the oil separating apparatus 114. Additionally, the boost air (heated or cooled to the desired temperature range within the heat exchanger 112) can be utilized to warm or cool the blow-by gas within the oil separating apparatus 114 to maintain a desired temperature range for the blow-by gas. This desired temperature range for the blow-by gas can be above a dew point temperature of the blow-by gas and below a temperature at which one or more components of the oil separating apparatus 114 become inoperable.

The first turbocharger 116 can be in fluid communication with the oil separating apparatus 114 to receive the filtered blow-by gas and the boost air. The first turbocharger 116 can be used to draw or pull the blow-by gas through the oil separating apparatus 114. The motive device 116 can pass the filtered blow-by gas and the boost air back to a charged air system (e.g., an aftercooler, manifold, combustion) to be routed again through the ventilation system 102. The first turbocharger 116 can be device configured to compress air and pass the compressed air to an ATAAC (FIG. 1A) or the aftercooler 106 (FIG. 1), for example.

Figure 2:
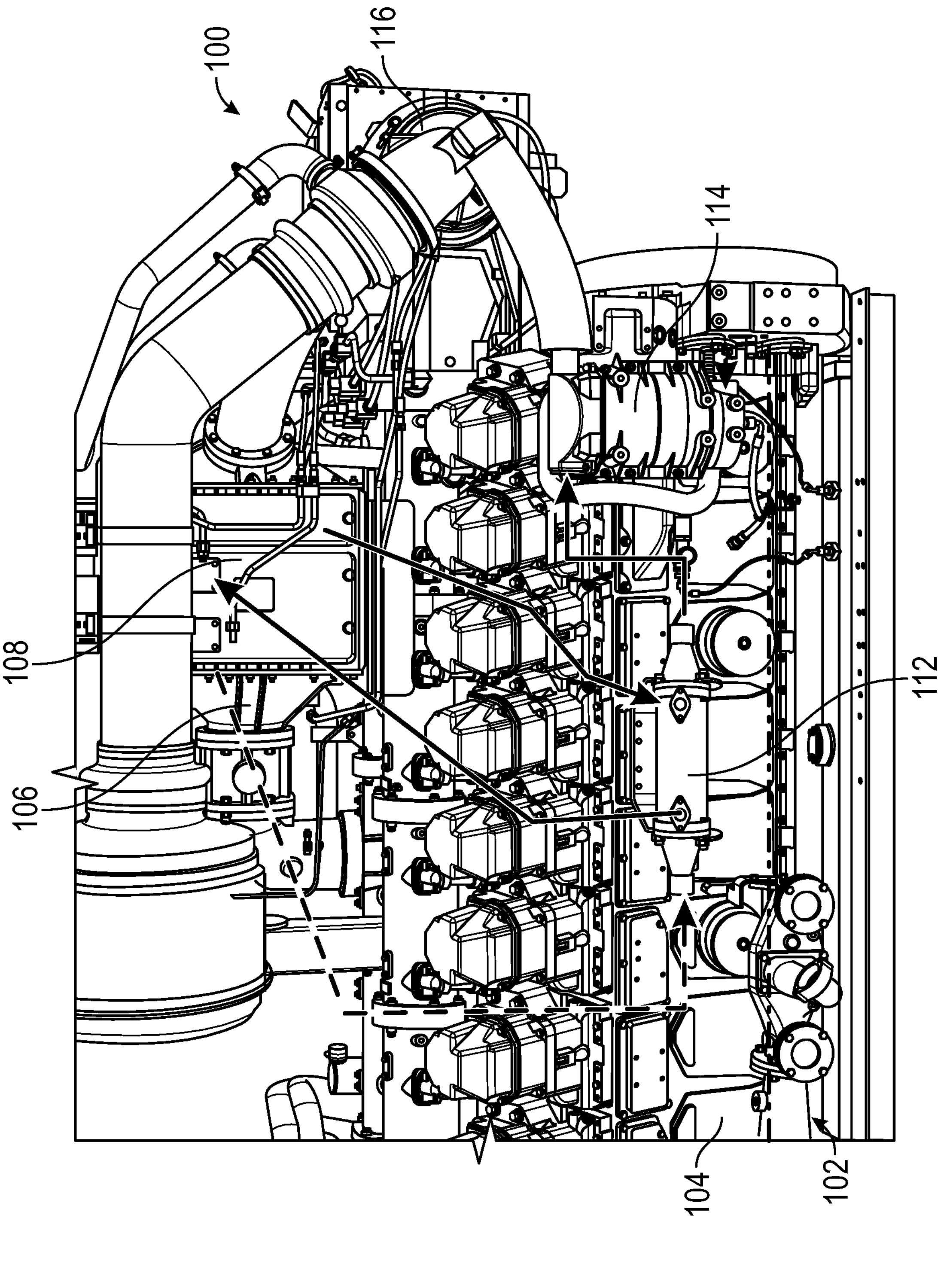
FIG. 2 is a perspective view of the ventilation system for the crankcase including the heat exchanger of FIG. 1.

FIG. 2 is a side view of a portion of the engine 100 including the ventilation system 102, crankcase 104, the aftercooler 106, the jacket 108, the heat exchanger 112, the oil separating apparatus 114, the first turbocharger 116 and the second turbocharger 120. The one or more breathers 110 (FIG. 1) and the passages 118A, 118B, 118C, 118D, 118E and 118F (FIG. 1) are not illustrated in FIG. 2. Rather the direction of flow of the boost air, the water and the blow-by gas are indicated with arrows in FIG. 2.

Figure 3:
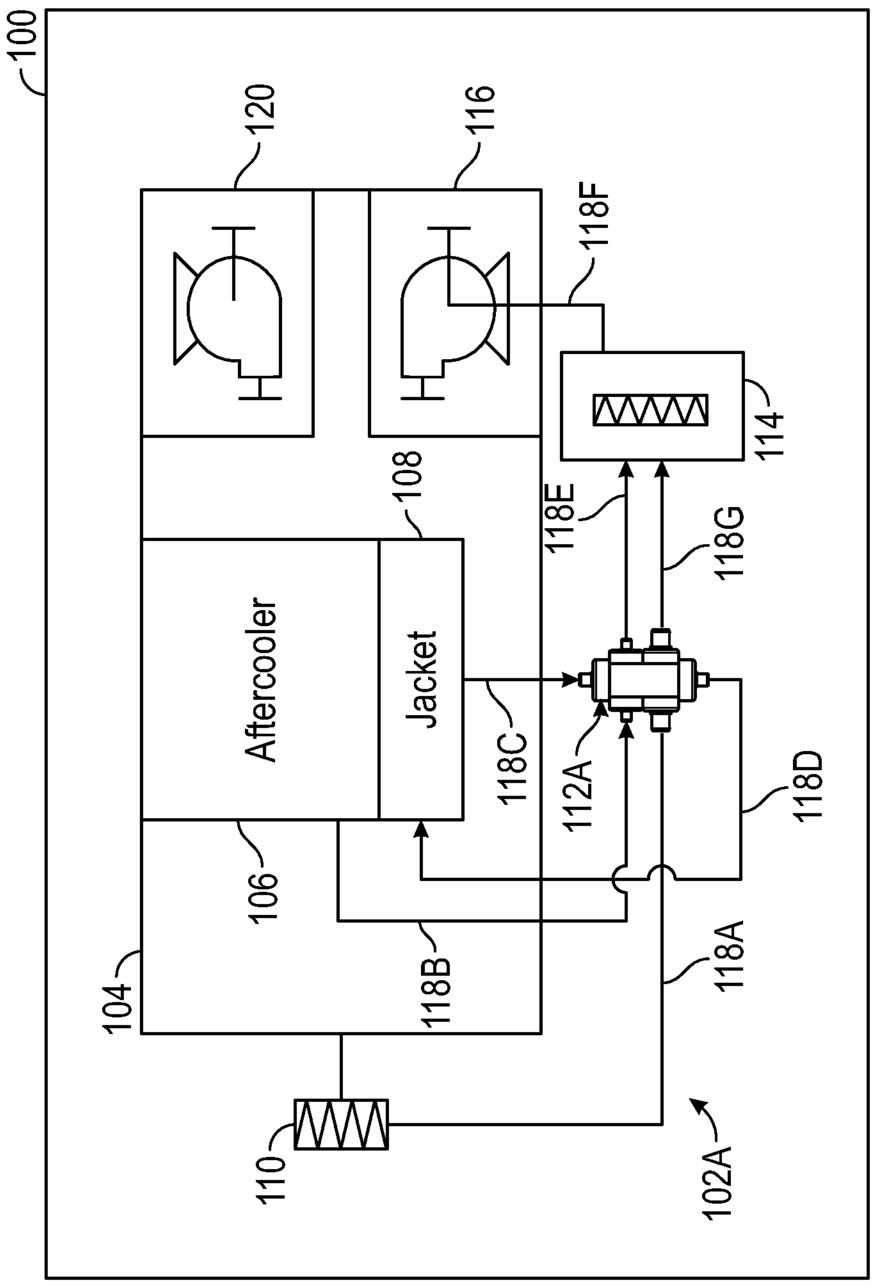
FIG. 3 is a highly schematic illustration of the internal combustion engine including the crankcase and another ventilation system for the crankcase including a second heat exchanger for warming the boost air and warming or cooling a blow-by gas in accordance with an example of this disclosure.

FIG. 3 schematically shows the engine 100 including the crankcase 104, the aftercooler 106, the jacket 108, one or more breathers 110, the oil separating apparatus 114, the first turbocharger 116, the passages 118A, 118B, 118C, 118D, 118E and 118F, and the second turbocharger 120 as previously discussed. The engine 100 includes a ventilation system 102A that utilizes a heat exchanger 112A design that is modified from that of the example of FIG. 1. In particular, the heat exchanger 112A is in fluid communication with both the boost air and the blow-by gas via passages 118A and 118B. The water from the jacket 108 is passed in a heat transfer relationship with both the boost air and the blow-by gas in the heat exchanger 112A. This arrangement can raise (or lower) the temperatures of the boost air and the blow-by gas entering the oil separating apparatus 114 as desired. The ventilation system 102A of FIG. 3 includes an additional passage 118G for communicating the heated or cooled blow-by gas from the heat exchanger 112A to the oil separating apparatus 114.

Figure 4:
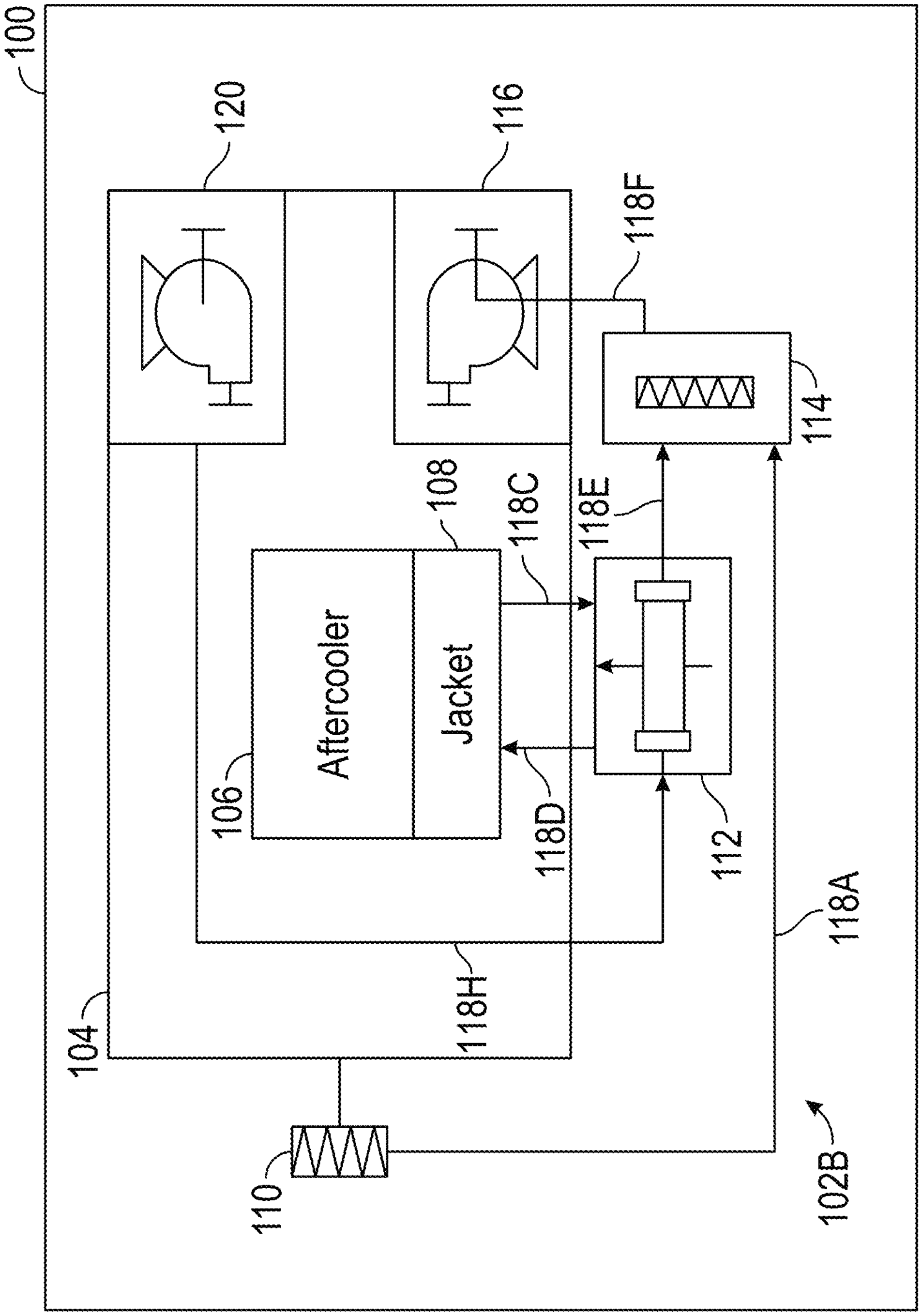
FIG. 4 is a highly schematic illustration of the example internal combustion engine including the crankcase and yet another ventilation system for the crankcase configured for cooling boost air in accordance with an example of this disclosure.

FIG. 4 schematically shows the engine 100 including the crankcase 104, the aftercooler 106, the jacket 108, the one or more breathers 110, the heat exchanger 112, the oil separating apparatus 114, the first turbocharger 116, the passages 118B, 118C, 118D, 118E and 118F, and the second turbocharger 120 as previously discussed. The engine 100 includes a ventilation system 102B that is modified to have a passage 118H that communicates relatively warmer boost air (as compared with the configurations of FIGS. 1-3) to the heat exchanger 112. In particular, the source of the boost air can be upstream of the aftercooler 106 such as at or downstream of the second turbocharger 120, for example. The flow of the water from the jacket 108 can be reversed from the configuration of FIG. 1. The water is passed in the heat transfer relationship with the boost air in the heat exchanger 112 to cool the boost air to achieve the desired temperature range for the boost air passing to the oil separating apparatus 114. It is contemplated that the configuration of the system of FIG. 4 could also be used with the configuration of the system of FIG. 3 according to some examples.

INDUSTRIAL APPLICABILITY

In operation, the engine 100 can be configured to combust fuel to generate power. While typically efficient, a small portion of the blow-by gases may escape the combustion chamber past the piston and enter undesirable areas of the engine such as the crankcase 104. The air the ventilation systems 102, 102A and 102B uses acts to ventilate the crankcase 104 and other components. This ventilation can include use of the oil separating apparatus 114 to filter oil to remove the oil from the blow-by gas.

Oil separating apparatuses containing coalescing filters are known, however, these have disadvantages. These devices typically lack cold climate capability. For example, in a cold climate water vapor can condense out and/or freeze within the oil separating apparatus or other components of the engine 100. This condensed and/or frozen water vapor can restrict flow of blow-by gas, which can lead to unwanted pressure spikes within the engine.

The present application recognizes a construction for the ventilation system(s) 102, 102A, 102B that utilizes the heat exchanger 112, 112A to cool, maintain, and/or warm boost air that is then passed to and utilized to warm or cool the blow-by gas within the oil separating apparatus 114. This can allow the blow-by gas to achieve the desired temperature range including in the oil separating apparatus 114. As an example, the boost air can be pre-heated in the heat exchanger 112 using the jacket water during engine startup and heated during engine operation (including idling) prior to entering the oil separating apparatus 114. This improves operation of the oil separating apparatus 114 in cold climate as condensed water vapor, emulsions and/or frozen water vapor that restricts flow can be avoided. Thus, the design of the ventilation systems 102, 102A and 102B can have improved temperature robustness. Thus, the present ventilation systems 102, 102A and 102B can be configured to reduce or prevent water condensate, emulsion and/or freezing. Additionally, use of the water at a desired temperature (typically about 100 degrees Celsius) for heat exchange can eliminate the need for various control systems for the boost air, which can save cost and reduce system complexity. The temperature of the water is desirable as it will not raise the boost air to an undesirably high temperature that could lead to temperature degradation amongst the polymer and elastomer components of the oil separating apparatus 114, for example.

The above detailed description is intended to be illustrative, and not restrictive. The scope of the disclosure should, therefore, be determined with references to the appended claims, along with the full scope of equivalents to which such claims are entitled.

What is claimed is:

1. An internal combustion engine comprising:

a crankcase having a blow-by gas passing therethrough;

a source of a boost air;

a jacket containing a water;

an oil separating apparatus in fluid communication with the boost air and the blow-by gas and having a coalescing filter to separate oil from the blow-by gas; and a heat exchanger in fluid communication with the boost air, wherein the heat exchanger is in fluid communication with the jacket to receive the water, wherein the water is passed in a heat transfer relationship with the boost air in the heat exchanger to achieve a desired temperature range for the boost air passing to the oil separating apparatus.

2. The engine of claim 1, wherein the desired temperature range for the boost air to the oil separating apparatus is between about 70 degrees Celsius and 90 degrees Celsius.

3. The engine of claim 1, wherein the desired temperature range of the boost air within the oil separating apparatus is sufficient to maintain the blow-by gas above a dew point temperature of the blow-by gas and below a temperature at which one or more components of the oil separating apparatus become inoperable.

4. The engine of claim 1, wherein the source of the boost air is downstream of an aftercooler of the internal combustion engine.

5. The engine of claim 1, wherein the water is passed in the heat transfer relationship with the boost air in the heat exchanger to one of: warm or cool the boost air to achieve the desired temperature range for the boost air passing to the oil separating apparatus.

6. The engine of claim 1, wherein the heat exchanger is in fluid communication with the blow-by gas, and wherein the water is passed in a heat transfer relationship with the blow-by gas in the heat exchanger.

7. The engine of claim 1, wherein the source of the boost air is upstream of an aftercooler of the internal combustion engine.

8. The engine of claim 7, wherein the source of the boost air is a compressor of the internal combustion engine.

9. An engine system comprising:

a crankcase of an engine having a blow-by gas passing therethrough;

a source of a boost air;

an aftercooler;

a jacket containing a water;

an oil separating apparatus in fluid communication with the boost air and the blow-by gas and having a coalescing filter to separate oil from the blow-by gas; and a heat exchanger in fluid communication with the boost air, wherein the heat exchanger is in fluid communication with the jacket to receive the water, wherein the water is passed in a heat transfer relationship with the boost air in the heat exchanger to achieve a desired temperature range for the boost air passing to the oil separating apparatus; and either the source of the boost air is downstream of the aftercooler, and the water is passed in the heat transfer relationship with the boost air in the heat exchanger to warm the boost air to achieve the desired temperature range for the boost air passing to the oil separating apparatus or the source of the boost air is upstream of the aftercooler, and the water is passed in the heat transfer relationship with the boost air in the heat exchanger to cool the boost air to achieve the desired temperature range for the boost air passing to the oil separating apparatus.

10. The engine system of claim 9, wherein the heat exchanger is in fluid communication with the blow-by gas, and wherein the water is passed in a heat transfer relationship with the blow-by gas in the heat exchanger.

11. The engine system of claim 9, wherein the desired temperature range of the boost air within the oil separating apparatus is sufficient to maintain the blow-by gas above a dew point temperature of the blow-by gas and below a temperature at which one or more components of the oil separating apparatus become inoperable.

12. A method of maintaining a blow-by gas from a crankcase of an engine within a desired temperature range when passing through an oil separating apparatus, the method comprising:

passing the blow-by gas from the crankcase to the oil separating apparatus;

supplying a water from a jacket to a heat exchanger, wherein within the heat exchanger the water is in a heat transfer relationship with a boost air passing through the heat exchanger and heats or cools the boost air to a desired temperature range;

passing the boost air at the desired temperature range to the oil separating apparatus;

separating oil from the blow-by gas with the oil separating apparatus;

passing the blow-by gas after leaving the oil separating apparatus to a charged air system; and returning the water to the jacket after passing through the heat exchanger.

13. The method of claim 12, wherein the boost air is supplied in an amount that offsets a flow restriction of the blow-by gas through the oil separating apparatus.

14. The method of claim 12, wherein the desired temperature range for the blow-by gas is above a dew point temperature of the blow-by gas and below a temperature at which one or more components of the oil separating apparatus become inoperable.

15. The method of claim 12, further comprising supplying the boost air from one of upstream or downstream of an aftercooler of the engine.

16. The method of claim 12, further comprising passing the water in a heat transfer relationship with the blow-by gas in the heat exchanger.

17. The method of claim 12, wherein the desired temperature range for the boost air to the oil separating apparatus is between about 70 degrees Celsius and 90 degrees Celsius.

18. The method of claim 12, further comprising supplying the boost air from a compressor of the engine.

* * * * *